United States Patent

Canadas et al.

[11] Patent Number: 5,909,655
[45] Date of Patent: Jun. 1, 1999

[54] METHOD FOR PROCESSING REFLECTION SEISMIC TRACES RECORDED FOR VARIABLE OFFSETS

[75] Inventors: Guy Canadas, Pau; Jean-Pierre Dunand, Soumoulou, both of France

[73] Assignee: Elf Aquitaine Production, France

[21] Appl. No.: 08/849,356

[22] PCT Filed: Oct. 2, 1996

[86] PCT No.: PCT/FR96/01536

§ 371 Date: Aug. 11, 1997

§ 102(e) Date: Aug. 11, 1997

[87] PCT Pub. No.: WO97/14062

PCT Pub. Date: Apr. 17, 1997

[30] Foreign Application Priority Data

Jun. 10, 1995 [FR] France ................................ 95 11816

[51] Int. Cl.[6] .................................................. G06F 19/00
[52] U.S. Cl. ............................................................ 702/17
[58] Field of Search ................................ 702/14, 16, 17, 702/18

[56] References Cited

U.S. PATENT DOCUMENTS 5,258,960  11/1993  Swan .

FOREIGN PATENT DOCUMENTS 0548384  6/1993  European Pat. Off. .
9412484  10/1994  France .

OTHER PUBLICATIONS

Thorson, et al., "Velocity–Stack and Slant–Stack Stochastic Inversion", Geophysics, vol. 50, No. 12, Dec. 1985, pp. 2727–2741.

E.C. Reiter, et al., "2–D Velocity Inversion/Imaging of Large Offset Seismic Data Via The Tau–P Domain", Geophysics, vol. 58, No. 7, Jul. 1, 1993, pp. 1002–1016.

E. Bazelaire, "Normal moveout revisited: Inhomogeneous media and curved interfaces", Geophysics, vol. 53, No. 2, Feb. 1988, pp. 143–157.

*Primary Examiner*—Donald E. McElheny, Jr.
*Attorney, Agent, or Firm*—Ostrolenk, Faber, Gerb & Soffen, LLP

[57] ABSTRACT

A method of processing reflection seismic traces based on a D(tau, x2) diagram showing horizontal events (WAH-WDH). For each value of tau the corresponding signal amplitude is analyzed for the various x2 in a time window of less than a predetermined width. The amplitudes are subjected to conventional linear regression minimizing the sum of absolute values of discrepancies from the straight line, or the sum of their squares. Each concentration zone is swept by a straight line pivoting successively about each point with a slope equal to the square of the offset.

12 Claims, 4 Drawing Sheets

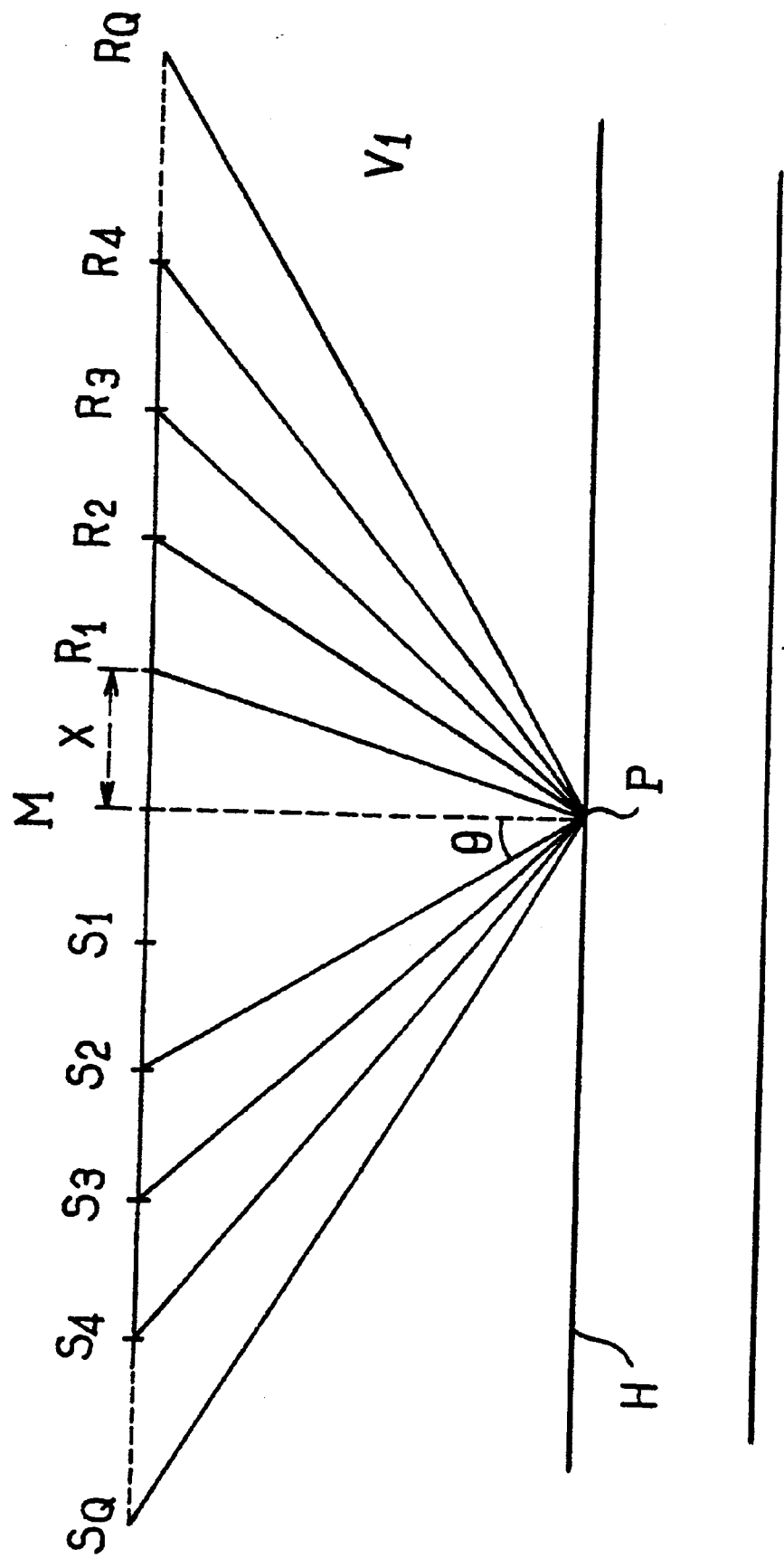
FIG_1

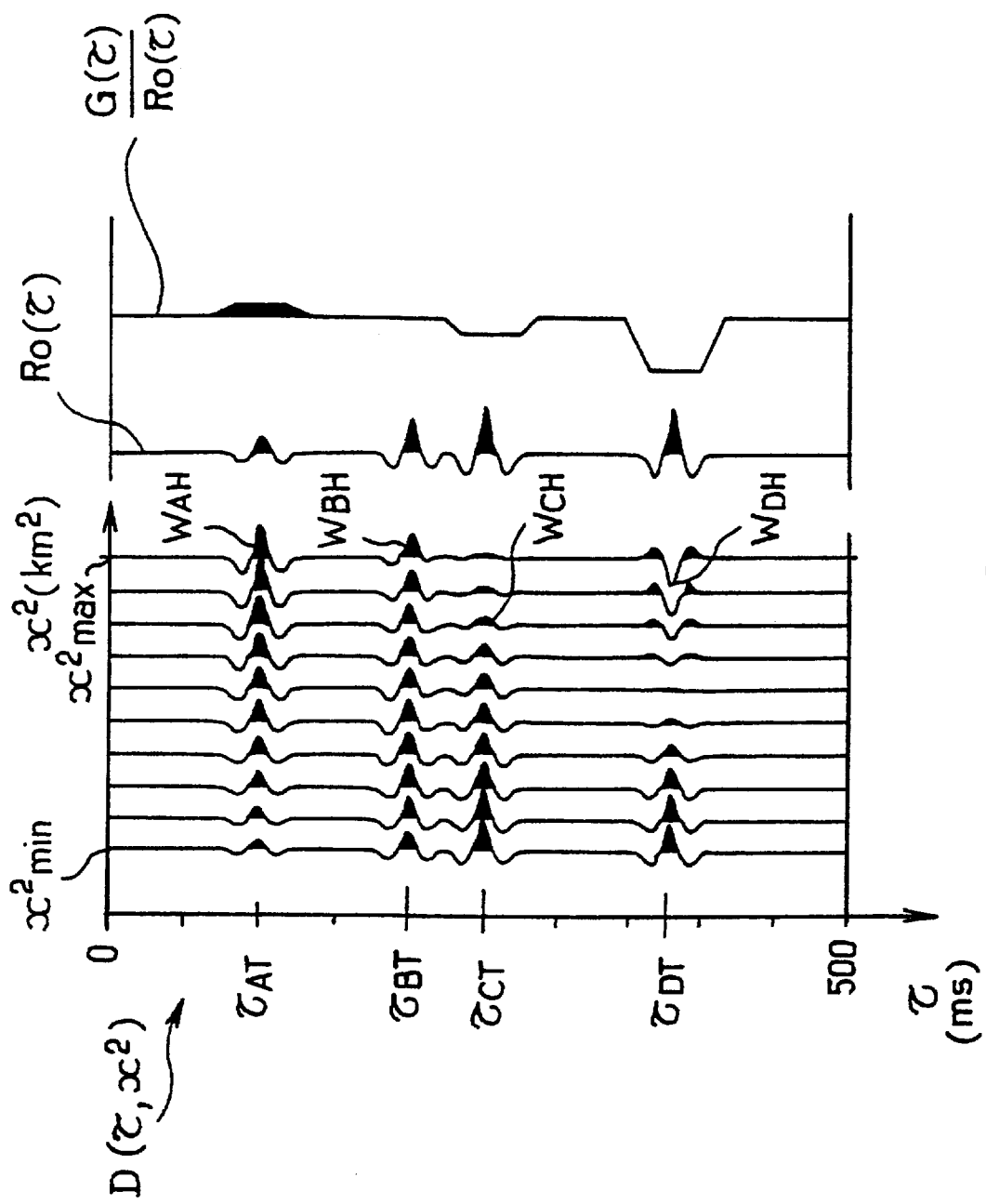
FIG_6

METHOD FOR PROCESSING REFLECTION SEISMIC TRACES RECORDED FOR VARIABLE OFFSETS

The present invention concerns a method for processing reflection seismic traces recorded for variable offsets. It refers more particularly to a method of processing energy concentration areas obtained in the transforms resulting from the application of a parabolic type transform to common midpoint (CMP) seismic trace gathers.

In petroleum exploration, one standard method of obtaining a seismic subsurface image is the reflection seismic method. In a method of this kind, acoustic waves are emitted by appropriate energy sources, referred to as emitters, propagate in the subsurface to be explored and are reflected at the various reflectors that it contains. The reflected waves are recorded as a function of time by appropriate receivers disposed on the surface of the ground or in the water. Each record provided by a receiver and known as a seismic trace is then subjected to projection of the point at the middle of the straight line segment joining the emitter and the receiver. This corresponds to common midpoint sorting.

In the well known seismic prospecting technique known as multiple coverage the emitters and the receivers are disposed on the surface of the ground in such a way that several recordings have the same midpoint. The series of records, or seismic traces, associated with the same midpoint forms what is known as a common midpoint gather of records or traces. This common midpoint gather of traces is a diagram in which the seismic traces corresponding to the same midpoint, which are recorded as a function of time $t$ for variable offsets $x$ of the receivers from said midpoint, are represented parallel to a time axis $t$ from respective abscissa points $x$ on an abscissa axis perpendicular to the time axis at the time origin. The set of common midpoint trace gathers is associated with a series of different midpoints preferably situated along a common line on the surface. Seismic processing produces from these trace gathers a seismic image in the vertical plane passing through all these midpoints. The arrival time of a recorded wave varies with the angle of incidence θ, which is the angle between the normal to the reflector at the point of reflection, known as the mirror point, and the direction of the (downgoing) incident wave. For the same gather and the same mirror point, this angle varies for each record as a function of the offset $x$ of the receiver relative to the midpoint. Under the standard hypothesis of a homogeneous and isotropic subsurface, with plane and parallel strata, the reflections associated with each of the subsurface reflectors, as observed on a common midpoint seismic trace gather, are theoretically aligned along hyperbolas centred on a vertical line through the midpoint and referred to as indicators. These common midpoint trace gathers are generally subjected to a time-dependent correction, known as normal moveout dynamic correction (NMO correction), the aim of which is to straighten the hyperbolic indicators so that they become theoretically horizontal. The dynamic correction conventionally applied is a correction based on the following equation:

$$t^2 = to^2 + \frac{x^2}{V^2} \quad (1)$$

in which:

$x$ is the offset as previously defined, to is the propagation time with reflection for a null offset $x$ between emitter and receiver, V, which varies with time, is a mean velocity of subsurface propagation of the waves, and $t$ is the propagation time after reflection associated with an emitter/receiver pair for an offset $x$.

Applying a parabolic transformation, and in particular the Radon generalised transformation, to common midpoint seismic trace gathers after dynamic (NMO) correction, designated hereinafter d(t,x) gathers, where $t$ and $x$ have the meanings given above in relation to NMO corrections, leads to a decomposition of the d(t,x) gathers along parabolas having the equation $t=\tau+qx^2$, where τ is the propagation time of the waves for a null offset $x$ and $x^2$ is the square of the offset.

The Radon parabolic transform of the d(t,x) gather is a diagram representing the function $\mu(\tau,q)$ defined by the equation:

$$d(t, x) = \sum_\tau \sum_q \mu(\tau, q) \cdot \delta[t - (\tau + qx^2)] \quad (2)$$

in which $t$, $x$, $\tau$, $q$ have the meanings indicated above and $\delta[t-(\tau+qx^2)]$ is equal to 1 if $t=\tau+qx^2$ and equal to 0 everywhere else. An event represented on the d(t,x) gather with an amplitude varying slowly along the parabola having equation $t=\tau_1+q_1x^2$ is represented on the $\mu(\tau,q)$ diagram by an energy concentration area centred on the point with coordinates $(\tau_1,q_1)$ and no energy is aliased far from this point. If the parabolic transform is formed correctly, the residues contain only incoherent noise and the seismic information is coded with aliasing in the diagram representing the parabolic transform $\mu(\tau,q)$.

The Radon type parabolic transformation applied to the d(t,x) gathers is essentially used at present to eliminate long period multiples. The process employed starts with transforming the d(t,x) gathers and the corresponding $\mu(\tau,q)$ diagrams, then defines a separation between the real seismic events of the multiples and then reconstructs directly the real events appearing in the $\mu(\tau,q)$ diagrams using the inverse parabolic transform or by subtracting from the d(t,x) gathers the multiples reconstructed from the $\mu(\tau,q)$ diagrams via the inverse parabolic transform.

It has now been found that the $\mu(\tau,q)$ diagrams obtained by application of a Radon type parabolic transform to the d(t,x) gathers could be used to produce data giving a better knowledge of NMO correction velocities, and thereby to perfect the horizontalisation of the indicators appearing in the d(t,x) gathers, and also to perform an analysis of the amplitudes as a function of the offsets (AVO analysis) leading to the determination of intercept (Ro) and gradient (G) parameters featuring in particular in the SHUEY equation $R(\theta)=Ro+Gsin^2\theta$, expressing the reflectivity $R(\theta)$ of the P waves as a function of the angle of incidence θ of said waves.

The invention therefore consists in a method of processing $\mu(\tau,q)$ diagrams produced by a Radon parabolic transform type curvilinear transform to the d(t,x) gathers to form new diagrams in a domain $(\tau,\xi)$ where $\xi$ represents the square of the offset, said $D(\tau,\xi)$ diagrams enabling the parameters referred to above to be determined.

In more concrete terms, the method of the invention is a method of processing reflection seismic traces recorded as a function of time (t) for offsets (x) variable between a minimum offset and a maximum offset, wherein:

gathers d(t,x) of normal moveout corrected (NMO corrected) common midpoint seismic traces are constituted in a first domain (t,x) from recorded seismic traces and a time dependent correction velocity law $(V_{NMO})$, a transform is applied to the d(t,x) gathers in said first domain so that there corresponds to each d(t,x) gather a $\mu(\tau,q)$ diagram in a second domain $\mu(\tau,q)$, so that a seismic event distributed along a curvilinear trajectory in the d(t,x) gather is focused in an energy concentration area in the $\mu(\tau,q)$ diagram in the second domain, the variation ($\tau$) designating the propagation time of the seismic waves with reflection for a null offset (x=0) and the variable q being a parameter associated with the curvature of said curvilinear trajectory, characterised in that, in each $\mu(\tau,q)$ diagram:

a) the coordinates $(\tau_k, q_k)$ of an apparent centre of each energy concentration area are picked, b) a window containing all of said energy concentration area is determined for each energy concentration area, c) each energy concentration area is swept in the corresponding window centred at the point with coordinates $(\tau_k, q_k)$ by a straight line segment that pivots successively about each of the points with coordinates $(\tau, q_k)$ inside said window and the slope of which is equal to the square of the offset and varies between two limits bracketed by the squares of the minimum and maximum offsets, d) the amplitudes of the signals in said window and intercepted by said straight line segment are stacked along said straight line segment, and in that:

e) the stacked values for each energy concentration area considered are represented in the form of a $D(\tau,x^2)$ diagram in a third domain $(\tau,x^2)$.

The set of operations b) through e) constitutes a reconstruction in the $(\tau,x^2)$ domain of seismic events previously focused in the $(\tau,q)$ domain. In what follows, the term "reconstruction" will refer to all of operations b) through e).

A parabolic event in the d(t,x) gather is reconstructed on the $D(\tau,x^2)$ diagram in the form of a linear event. If the reconstructed event is horizontal, this means that the point used for the reconstruction was correct. If the reconstructed event slopes, measuring its slope $\Delta q$ in the $x^2$ direction, which can be done using any appropriate technique, for example a semblance or coherence technique, supplies the correction to be applied to the q value of the pick. The new value for this pick will therefore be $q+\Delta q$.

The transform most commonly used to go from a d(t,x) gather in the (t,x) domain to the corresponding $\mu(\tau,q)$ diagram in the $(\tau,q)$ domain is a Radon parabolic transform. A transform of this kind is defined by the equation (2) given above, the curvilinear trajectory being a parabola with equation $t=\tau+qx^2$.

The transform for going from a d(t,x) gather in the (t,x) domain to the corresponding $\mu(\tau,q)$ diagram in the $(\tau,q)$ domain could equally well be a hyperbolic type Radon transform using a family of invariant hyperbolas by translation in time. A family of hyperbolas of this kind can be obtained as described in the article by Eric de BAZELAIRE entitled "Normal moveout revisited: Inhomogeneous media and curved interfaces", published in GEOPHYSICS, Volume 53, No 2, February 1988, pages 143 through 157, for example, or as indicated in the French patent application filed by the applicant on Oct. 19 1994 under application No 94 12 484 with the following title in translation: "Method for analysing and processing reflection seismic data for determining a fine hyperbolicity correction velocity field".

If the events corresponding to the various values $\tau_i$ if the parameter $\tau$ are horizontalised in the $x^2$ direction on the $D(\tau,x^2)$ diagram, said diagram is then subjected to an AVO analysis leading to the determination of the intercept (Ro) and gradient (G) parameters.

To this end, for each $\tau_i$ of the $D(\tau,x^2)$ diagram, the amplitude of the corresponding signal of said diagram is analysed for the various values of $x^2$ in an opening time window $|\tau-\tau_i|<\Delta t$, where $\Delta t$ represents a predetermined value, and linear regression is applied to the amplitudes as a function of $x^2$, which enables the values of Ro and G to be deduced, which values and combinations thereof are then represented as a function of $\tau$ to provide the intercept Ro($\tau$), gradient G($\tau$) or other sections, for example the $G/Ro(\tau)$ section, well known in AVO analysis.

Other features and advantages will emerge from a reading of one embodiment of the method of the invention illustrated by the accompanying drawings, in which:

FIG. 1 is a highly schematic representation of a set of emitters and receivers for emitting and receiving/recording seismic waves propagating in a first subsurface layer to be explored;

FIG. 6 is a representation of the $D(\tau,x^2)$ diagram from FIG. 5 after horizontalisation for an AVO analysis with simultaneous representation of the Ro($\tau$) and G+e,fra Ro+ee ($\tau$) sections.

Figure 2:
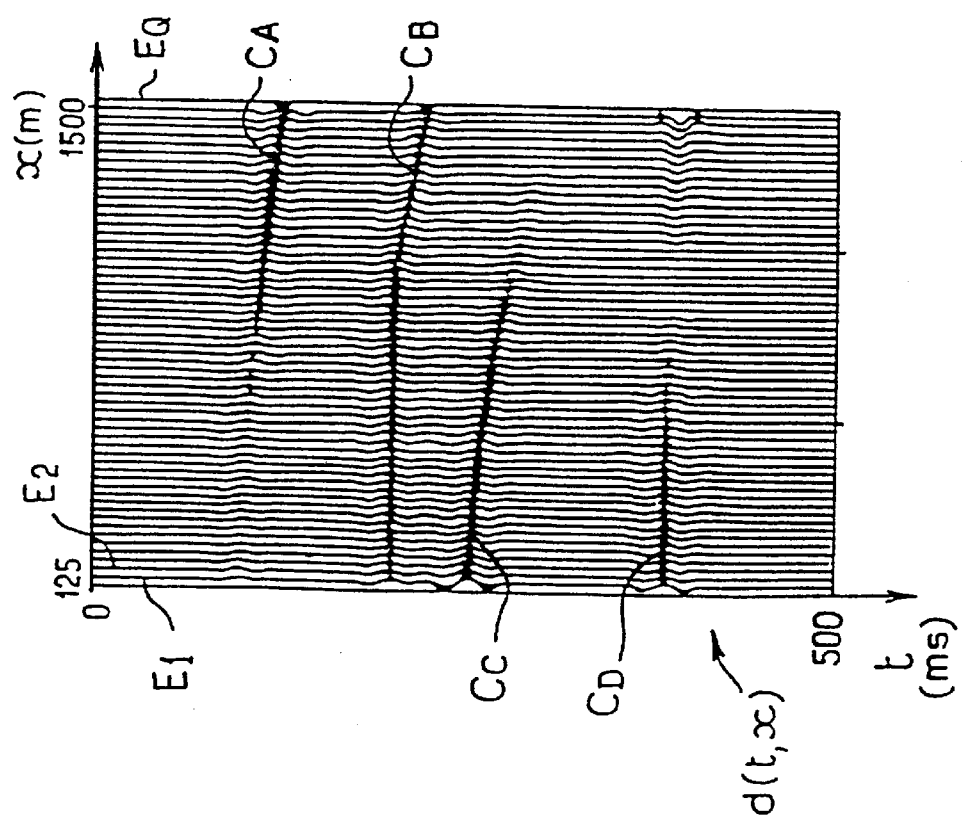
FIG. 2 is a schematic representation of a gather d(t,x) of seismic traces with common midpoint after normal moveout (NMO) correction, as a function of the receiver offset.

In the device shown diagrammatically in FIG. 1, the emitter $S_1$/receiver $R_1$ pair is associated with the minimum offset seismic trace $E_1$ of FIG. 2 after dynamic (NMO) correction. The emitter $S_2$/receiver $R_2$ pair is associated with the greater offset NMO corrected seismic trace $E_2$, and so on up to the emitter $S_Q$/receiver $R_Q$ pair associated with the NMO corrected seismic trace $E_Q$ linked to the maximum offset. The reflections associated with each stratum limit of the geological model, such as the limit H, are represented in each of the synthesised records of FIG. 2 by a juxtaposition of responses organized along NMO corrected indicators of said FIG. 2, in which only four of them $C_A$ through $C_D$ are shown.

The normal moveout (NMO) correction step applied to a common midpoint gather of seismic traces to produce a corresponding NMO corrected common midpoint gather of seismic traces (d(t,x) gather) is well known to geophysicists and will therefore not be described in detail.

The gather of seismic traces shown in FIG. 2 constitutes the d(t,x) gather of imperfectly NMO corrected common midpoint seismic traces to which is applied the Radon parabolic transform defined by equation (2) previously given. This transforms the d(t,x) gather from FIG. 2, which is a representation in the (t,x) domain, into the $\mu(\tau,q)$ diagram in the $(\tau,q)$ domain. In said parabolic transform, the branches of the indicators $C_A$, $C_B$, $C_C$ and $C_D$ featuring in the d(t,x) gather from FIG. 2 are focused in the $\mu(\tau,q)$ diagram shown in FIG. 3 in the respective energy concentration areas $B_A$, $B_B$, $B_C$ and $B_D$. In theory, a seismic event featuring in the d(t,x) gather with an amplitude varying slowly along the parabola with equation $t=\tau_1+q_1x^2$ is focused in the $\mu(\tau,q)$ diagram in a highly localized (point) energy concentration area centred at the point with coordinates $(\tau_1, q_1)$ and no energy is aliased far from this point. In practice each energy concentration area such as $B_A$, $B_B$, $B_C$ or $B_D$ is formed of a centre, for example $K_B$ for the area $B_B$, and two more or less developed branches, one horizontal in the q direction, for example branch $L_B$ for area $B_B$, and the other sloping, for example branch $J_B$ for area $B_B$. The centre of an energy concentration area receives a contribution from all the offsets, whereas the horizontal branch is mainly concerned with near offset and the sloping branch mainly with far offsets. The configuration of an energy concentration area in the $\mu(\tau,q)$ diagram depends only on the amplitudes along the parabolic event.

After integration relative to $\tau$, equation (2) defining the parabolic transform used to transform $d(t,x)$ to $\mu(\tau,q)$ can be written:

$$d(t, x) = \sum_q \mu(t - q \cdot x^2, q) \qquad (3)$$

The parabolic events of the $d(t,x)$ gather can therefore be reconstructed for any offset $\underline{x}$ by stacking of $\mu(\tau,q)$ along straight line segments with equation $\tau = t - \xi q$ where $\xi$ represents the square $x^2$ of the offset.

An approximate value of the coordinates of the centre of an energy concentration area in the $\mu(\tau,q)$ diagram, for example with coordinates $(\tau_2, q_2)$ for the centre of the area $B_A$, can be determined, for example, by picking the coordinates of the local 2D maximum of the envelope of said energy concentration area. The amplitude $D(\tau,\xi=x^2)$ of the event along parabolas $t(x) = \tau + q_2 x^2$ for values of $\tau$ in the time window $\tau 2 - \Delta t \leq \tau \leq \tau_2 + \Delta t$ where $\Delta t$ is a predetermined value corresponding in particular to the duration of the signal can be calculated from the amplitudes of the $\mu(\tau,q)$ diagram using the following equation:

$$D(\tau \cdot \xi = x^2) = \sum_q \mu(\tau - x^2(q - q_2), q) \qquad (4)$$

the values of $x^2$ being regularly sampled in the range $x^2_{min} < x^2 < x^2_{max}$, where $x^2_{min\ and\ x^2\ max}$ are respectively minimal and maximal predetermined values bracketed by the squares of the minimum and maximum offsets.

To carry out the stacking defined by equation (4) the variation range of q must cover all of the energy concentration area of the $\mu(\tau,q)$ diagram on which the stacking is done. This range of variation of q must not be too wide, however, to prevent any interference with neighbouring energy concentration areas. In concrete terms, an analysis window is defined in the q direction having a width $|q-q_k| < A(\tau)$ where $A(\tau)$ is a predetermined value dependent on $\tau$, and stacking is applied with a ramp to soften edge effects (smoothing taper).

In accordance with the invention, starting with the $\mu(\tau,q)$ diagram, a $D(\tau,\xi=x^2)$ diagram of linear events in the $(\tau,x^2)$ domain is constructed in which each linear event corresponds to one area of concentration of energy of the $\mu(\tau,q)$ diagram.

Figure 4:
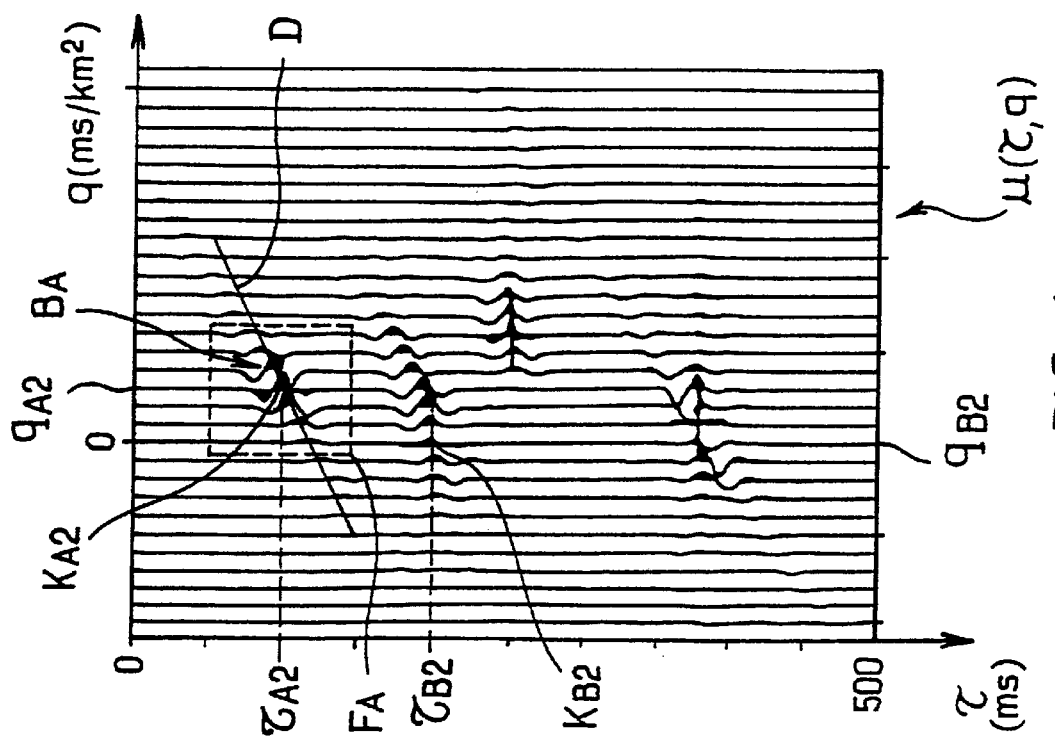
FIG. 4 is a representation of the $\tau(\tau,q)$ diagram from FIG. 3 including a pick of the apparent centres of the energy concentration areas.

The following procedure is used to construct the linear event of the $D(\tau,x^2)$ diagram corresponding to an energy concentration area of the $\mu(\tau,q)$ diagram:

Firstly, the apparent centre $K(\tau_k,q_k)$ of the energy concentration area to be processed is picked, for example the apparent centre $K_{A2}$ of the area $B_A$ of concentration of energy of the $\mu(\tau,q)$ diagram shown in FIG. 4. As previously indicated, this can be carried out, for example, by picking the coordinates of the local 2D maximum of the envelope of said energy concentration area, for example the coordinates $(\tau_{A2}, q_{A2})$ of said maximum corresponding to the area $B_A$.

A window is also defined centred on the picked apparent centre of the energy concentration area to be processed and having an aperture equal to 2 $\Delta t$ in the direction $\tau$ and an aperture equal to 2 $A(\tau)$ in the q direction, $\Delta t$ and $A(\tau)$ being predetermined values as defined previously such that said window covers all of the energy concentration area to be processed. In the case of processing the area $B_A$ of concentration of energy shown in the $\mu(\tau,q)$ diagram shown in FIG. 4, the window $F_A$ chosen covers values of $\tau$ such that $\tau_{A2}-\Delta t \leq \tau \leq \tau_{A2}+\Delta t$ and values of q such that $q_{A2}-A(\tau) \leq q \leq q_{A2}+A(\tau)$, $\tau_{A2}$ and $q_{A2}$ being the coordinates of the apparent centre $K_{A2}$ of the energy concentration area $B_A$ on which the window $F_A$ is centred.

To perform, in relation to a pick $(\tau_i, q_i)$, the stacking defined by equation (4), which enables reconstitution in the $(\tau,\xi=x^2)$ domain of the linear event corresponding to the corresponding energy concentration area of the $\mu(\tau,q)$ diagram of the $(\tau,q)$ domain, said energy concentration area is swept in the corresponding window, centred on the point $(\tau_i,q_i)$ and covering all of this area, by a straight line segment that pivots successively around each of the points with coordinates $(\tau_i,q_i)$ with $\tau_i - \Delta t \leq \tau \leq \tau_i + \Delta t$. To be more precise, for each value of $\tau$ in the window and for each value or $\xi = x^2$, stacking the samples of the energy concentration area along the straight line segment of slope $\xi = x^2$ and passing through the point $(\tau_i,q_i)$ gives the value of $D(\tau,\xi=x^2)$ For example, as shown diagrammatically in FIG. 4, the stacking is done in the window $F_A$ centred on the apparent centre $K_{A2}$ with coordinates $(\tau_{A2},q_{A2})$ of the energy concentration area $B_A$ and covering all of this area by a straight line segment D that pivots successively about each of the points with coordinates $(\tau,q_{A2})$ with $\tau_{A2}-\Delta t \leq \tau \leq \tau_{A2}+\Delta t$, said points including the point $(\tau_{A2},q_{A2})$ The amplitudes of the sums calculated for the various values of the slope $x^2$ of the straight line segment sweeping an energy concentration area of the $\mu(\tau,q)$ diagram having an apparent centre with coordinates $(\tau_i,q_i)$ are represented on a $D(\tau, x^2)$ diagram in the $(\tau, x^2)$ domain at the ordinate $\tau = \tau_i$ for the various values of $x^2$ from $x^2_{min}$ through $x^2_{max}$. Accordingly, in FIG. 5, event $W_A$, represented at the ordinate $\tau = \tau_{A2}$ for the various values of $x^2$, corresponds to the seismic event $C_A$ from the $d(t,x)$ gather of FIG. 2 focused, by the Radon parabolic transform, in the energy concentration area $B_A$ of the $\mu(\tau,q)$ diagram of FIG. 3 or FIG. 4.

Figure 3:
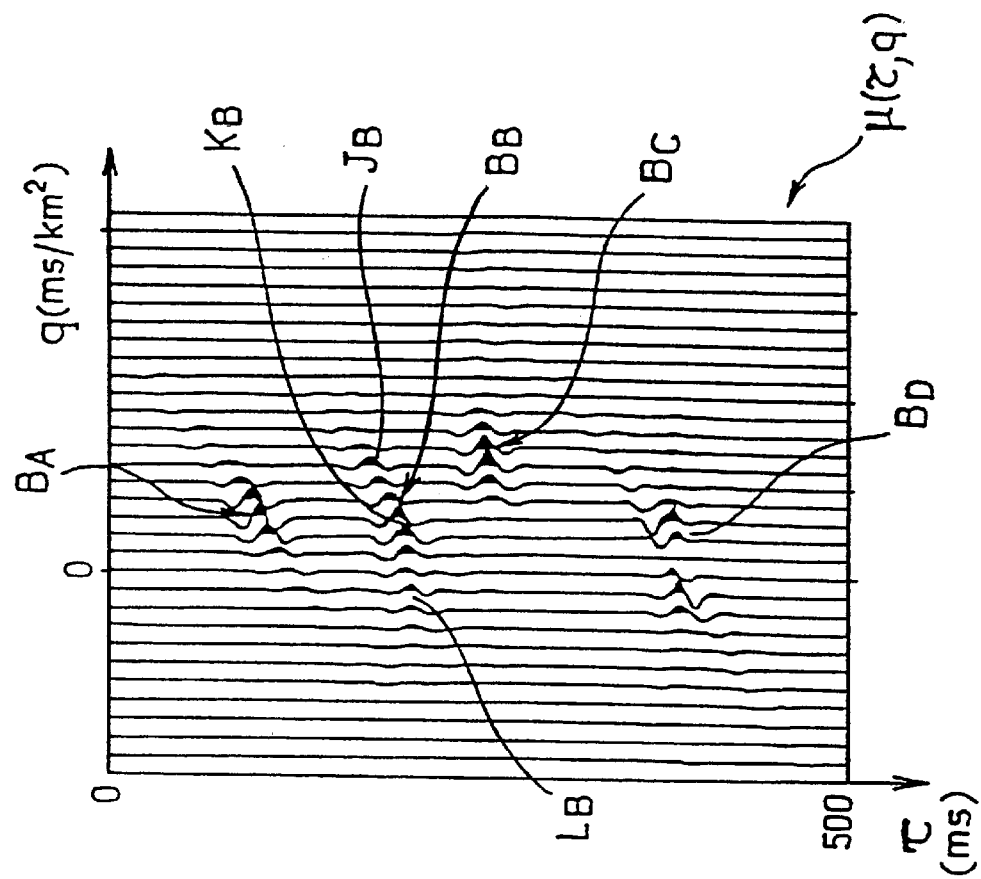
FIG. 3 is a representation of a $\mu(\tau,q)$ diagram transformed from the d(t,x) gather by application of a Radon parabolic transform to said gather.
Figure 5:
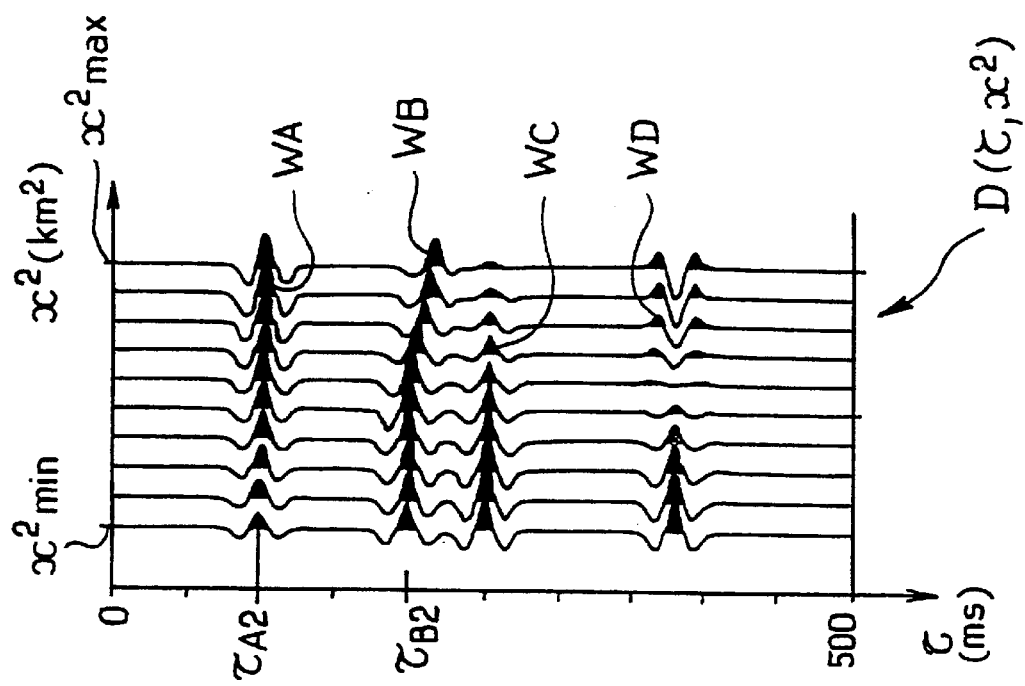
FIG. 5 is a representation of the $D(\tau,x^2)$ transform of the $\mu(\tau,q)$ diagram from FIG. 4.

The other events $W_B$, $W_C$ and $W_D$ also represented in the $D(\tau,x^2)$ of FIG. 5 are obtained as indicated for the event $W_A$, respectively from the energy concentration areas $B_B$, $B_C$ and $B_D$ of the $\mu(\tau,q)$ diagram shown in FIG. 3 or FIG. 4, said areas being respectively the Radon parabolic transforms of the seismic events $C_B$, $C_C$ and $C_D$ of the $d(t,x)$ gather from FIG. 2.

A horizontal event in the $x^2$ direction on the $D(t,x^2)$ diagram, for example the event $W_A$ at the ordinate $\tau = \tau_{A2}$ in the FIG. 5 diagram, indicates that the apparent picked centre of the corresponding energy concentration area, for example the centre $K_{A2}$ with coordinates $(\tau_{A2},q_{A2})$ for the energy concentration area $B_A$ shown in the $\mu(\tau,q)$ diagram of FIG. 4, coincides with the theoretical centre of said energy concentration area. The coordinates of said centre, for example the coordinates $(\tau_{A2},q_{A2})$ of the centre $K_{A2}$, are used to calculate the value V of the NMO velocity of the initial hyperbolic seismic event, for example the seismic event $C_A$, appearing in the $d(t,x)$ gather of FIG. 2, from the equation $$\frac{1}{V^2} = \frac{1}{V^2_{NMO}} + 2\tau_k q_k \quad (5)$$

where $\tau_k$ and $q_k$ are the coordinates of the pick and $V_{NMO}$ is the velocity used for the initial dynamic (NMO) corrections.

A sloping event on the $D(\tau,x^2)$ diagram, for example the event $W_B$ in the $D(\tau,x^2)$ shown in FIG. 5, indicates that the apparent pick centre with coordinates $(\tau_k,q_k)$ of the corresponding energy concentration area of the $\mu(\tau,q)$ diagram, for example the centre $K_{B2}$ with coordinates $(\tau_{B2}, q_{B2})$ of the energy concentration area $B_B$ of the $\mu(\tau,q)$ diagram from FIG. 4, does not coincide with the theoretical centre with coordinates $(\tau_T,q_T)$ of said area. The slope of said event in the $x^2$ direction is $\Delta q=q_k-q_T$. It can be determined, for example, by conventional weighted semblance or coherence techniques and, on the basis of the value of said slope and the value of $q_k$, it is possible to calculate the value of the coordinates $(\tau_T,q_T)$, which, via equation (5), provides access to the NMO velocity V of the initial hyperbolic seismic event appearing in the d(t,x) gather. This calculation process is used for small values of the slope $\Delta q$.

If the slope $\Delta q=(q_k-q_T)$ is high, the processing of the energy concentration area is reiterated with the new value $q'_k=q_k+\Delta q$ until a horizontal event is obtained on the $D(\tau,x^2)$ diagram, from which it is possible to work back to the theoretical coordinates of the centre of the energy concentration area corresponding to said event, and, by application of equation (5), to the NMO velocity V of the associated initial hyperbolic seismic event featuring in the d(t,x) gather.

If necessary, and if the signal/noise ratio associated with an event from the $D(\tau,x^2)$ diagram allows, residual static correction processing can be applied to said event to horizontalise it.

The $D(\tau,x^2)$ diagram for which the events are horizontalised, for example the $D(\tau,x^2)$ diagram shown in the lefthand part of FIG. 6 showing the horizontalised events $W_{AH}$, $W_{BH}$, $W_{CH}$ and $W_{DH}$ respectively corresponding to the events $W_A$, $W_B$, $W_C$ and $W_D$ of the $D(\tau,x^2)$ diagram shown in FIG. 5, is used for an AVO analysis to determine the Ro (intercept) and G (gradient) coefficients. To this end, for each $\tau_i$ of the $D(\tau,x^2)$ diagram the amplitude of the corresponding signal of said diagram is analysed for the various $x^2$, in a time window $|\tau-\tau_i|<\Delta t$, where $\Delta t$ designates a predetermined value as previously indicated, and linear regression is applied to the amplitudes as a function of $x^2$ using conventional linear regression processes minimising the sum of the absolute values of the differences between the amplitudes as determined and as represented as a function of $x^2$ and the amplitudes supplied by the linear regression straight line segment or minimising the sum of the squares of said differences. Values of Ro and G are deduced from the equation of the linear regression straight line segment. These parameters or combinations of them can be represented as a function of $\tau$ to provide diagrams such as the intercept section diagram Ro($\tau$), gradient section diagram G($\tau$), G/Ro($\tau$) section diagram, etc. The righthand part of FIG. 6 shows the Ro($\tau$) section and the G/Ro($\tau$) section corresponding to the $D(\tau,x^2)$ diagram of horizontalised events shown in the lefthand part of said figure.

What is claimed is:

1. Method of processing reflection seismic traces recorded as a function of time (t) for offsets (x) variable between a minimum offset and a maximum offset, wherein:

gathers d(t,x) of normal moveout corrected (NMO corrected) common midpoint seismic traces are constituted in a first domain (t,x) from recorded seismic traces and a time dependent correction velocity law ($V_{NMO}$), a transform is applied to the d(t,x) gathers in said first domain so that there corresponds to each d(t,x) gather a $\mu(\tau,q)$ diagram in a second domain $\mu(\tau,q)$, so that a seismic event distributed along a curvilinear trajectory in the d(t,x) gather is focused in an energy concentration area in the $\mu(\tau,q)$ diagram in the second domain, the variation ($\tau$) designating the propagation time of the seismic waves with reflection for a null offset (x=0) and the variable q being a parameter associated with the curvature of said curvilinear trajectory, characterised in that, in each $\mu(\tau,q)$ diagram:

a) the coordinates $(\tau_k,q_k)$ of an apparent centre of each energy concentration area are picked, b) a window containing all of said energy concentration area is determined for each energy concentration area, c) each energy concentration area is swept in the corresponding window centred at the point with coordinates $(\tau_k,q_k)$ by a straight line segment that pivots successively about each of the points with coordinates $(\tau,q_k)$ inside said window and the slope of which is equal to the square of the offset and varies between two limits bracketed by the squares of the minimum and maximum offsets, d) the amplitudes of the signals in said window and intercepted by said straight line segment are stacked along said straight line segment, and in that:

e) the stacked values for each energy concentration area are represented in the form of a $D(\tau,x^2)$ diagram in a third domain $(\tau,x^2)$.

2. Method according to claim 1 characterised in that the transform for going from a d(t,x) gather in the (t,x) domain to the corresponding $\mu(\tau,q)$ diagram in the $(\tau,q)$ domain is a Radon parabolic transform.

3. Method according to claim 1 characterised in that the transform for going from a d(t,x) gather in the (t,x) domain to the corresponding $\mu(\tau,q)$ diagram in the $(\tau,q)$ domain is a hyperbolic type Radon transform using a family of invariant hyperbolas by translation in time.

4. Method according to claim 1 characterised in that the energy concentration area in the $\mu(\tau,q)$ diagram corresponds to stacked amplitudes constituting a sloping event in the $x^2$ direction on the $D(\tau,x^2)$ diagram transformed from the $\mu(\tau,q)$ diagram and in that the slope of the direction of said event, which is representative of the difference between the values of the parameter q associated with the picked apparent centre and the theoretical centre of said energy concentration area, is determined.

5. Method according to claim 1 characterised in that the events represented on the $D(\tau,x^2)$ diagram are horizontalised and in that for each $\tau_i$ of the $D(\tau,x^2)$ diagram the amplitude of the corresponding signal of said diagram is analysed for the various values of $x^2$ in a time window of aperture $|\tau-\tau_i|<\Delta t$, where $\Delta t$ represents a predetermined value, and linear regression is applied to the amplitudes as a function of $x^2$ from which intercept (Ro) and gradient (G) parameters are deduced, produced on analysing variations of amplitude with the offset (AVO analysis) and usable to constitute sections representing, as a function of $\tau$, the parameter Ro (intercept section), the parameter G (gradient section) or combinations of these parameters, in particular the ratio G/Ro.

6. Method according to claim 2 characterized in that the energy concentration area in the $\mu(\tau,q)$ diagram corresponds to stacked amplitudes constituting a sloping event in the $x^2$ direction on the $D(\tau,x^2)$ diagram transformed from the $\mu(\tau,q)$ diagram and in that the slope of the direction of said event, which is representative of the difference between the values of the parameter q associated with the picked apparent centre and the theoretical centre of said energy concentration areas is determined.

7. Method according to claim 3 characterized in that the energy concentration area in the $\mu(\tau,q)$ diagram corresponds to stacked amplitudes constituting a sloping event in the $x^2$ direction on the $D(\tau,x^2)$ diagram transformed from the $\mu(\tau,q)$ diagram and in that the slope of the direction of said event, which is representative of the difference between the values of the parameter q associated with the picked apparent centre and the theoretical centre of said energy concentration area, is determined.

8. Method according to claim 2 characterized in that the events represented on the $D(\tau,x^2)$ diagram are horizontalised and in that for each $\tau_i$ of the $D(\tau,x^2)$ diagram the amplitude of the corresponding signal of said diagram is analyzed for the various values of $x^2$ in a time window of aperture $|\tau-\tau_i|<\Delta t$, where $\Delta t$ represents a predetermined value, and linear regression is applied to the amplitudes as a function of $x^2$ from which intercept (Ro) and gradient (G) parameters are deduced, produced on analyzing variations of amplitude with the offset (AVO analysis) and usable to constitute sections representing, as a function of $\tau$, the parameter Ro (intercept section), the parameter G (gradient section) or combinations of these parameters, in particular the ratio G/Ro.

9. Method according to claim 3 characterized in that the events represented on the $D(\tau,x^2)$ diagram are horizontalised and in that for each $\tau_i$ of the $D(\tau,x^2)$ diagram the amplitude of the corresponding signal of said diagram is analyzed for the various values of $x^2$ in a time window of aperture $|\tau-\tau_i|<\Delta t$, where $\Delta t$ represents a predetermined value, and linear regression is applied to the amplitudes as a function of $x^2$ from which intercept (Ro) and gradient (G) parameters are deduced, produced on analyzing variations of amplitude with the offset (AVO analysis) and usable to constitute sections representing, as a function of $\tau$, the parameter Ro (intercept section), the parameter G (gradient section) or combinations of these parameters, in particular the ratio G/Ro.

10. Method according to claim 4 characterized in that the events represented on the $D(\tau,x^2)$ diagram are horizontalised and in that for each $\tau$ of the $D(\tau,x^2)$ diagram the amplitude of the corresponding signal of said diagram is analyzed for the various values of $x^2$ in a time window of aperture $|\tau-\tau_i|<\Delta t$, where $\Delta t$ represents a predetermined value, and linear regression is applied to the amplitudes as a function of $x^2$ from which intercept (Ro) and gradient (G) parameters are deduced, produced on analyzing variations of amplitude with the offset (AVO analysis) and usable to constitute sections representing, as a function of $\tau$, the parameter Ro (intercept section) , the parameter G (gradient section) or combinations of these parameters, in particular the ratio G/Ro.

11. Method according to claim 6 characterized in that the events represented on the $D(\tau,x^2)$ diagram are horizontalised and in that for each $\tau_i$ of the $D(\tau,x^2)$ diagram the amplitude of the corresponding signal of said diagram is analyzed for the various values of $x^2$ in a time window of aperture $|\tau-\tau_i|<\Delta t$, where $\Delta t$ represents a predetermined value, and linear regression is applied to the amplitudes as a function of $x^2$ from which intercept (Ro) and gradient (G) parameters are deduced, produced on analyzing variations of amplitude with the offset (AVO analysis) and usable to constitute sections representing, as a function of $\tau$, the parameter Ro (intercept section), the parameter G (gradient section) or combinations of these parameters, in particular the ratio G/Ro.

12. Method according to claim 7 characterized in that the events represented on the $D(\tau,x^2)$ diagram are horizontalised and in that for each $\tau_i$ of the $D(\tau,x^2)$ diagram the amplitude of the corresponding signal of said diagram is analyzed for the various values of $x^2$ in a time window of aperture $|\tau-\tau_i|<\Delta t$, where $\Delta t$ represents a predetermined value, and linear regression is applied to the amplitudes as a function of $x^2$ from which intercept (Ro) and gradient (G) parameters are deduced, produced on analyzing variations of amplitude with the offset (AVO analysis) and usable to constitute sections representing, as a function of $\tau$, the parameter Ro (intercept section), the parameter G (gradient section) or combinations of these parameters, in particular the ratio G/Ro.

* * * * *